US010589677B1

(12) United States Patent
P et al.

(10) Patent No.: US 10,589,677 B1
(45) Date of Patent: Mar. 17, 2020

(54) SYSTEM AND METHOD TO EXHIBIT INFORMATION AFTER A PEDESTRIAN CRASH INCIDENT

(71) Applicant: GM GLOBAL TECHNOLOGY OPERATIONS LLC, Detroit, MI (US)

(72) Inventors: Rathan H. P, Karnataka (IN); Arun K. Murthy, Karnataka (IN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/157,166

(22) Filed: Oct. 11, 2018

(51) Int. Cl.
*B60R 1/00* (2006.01)
*B60R 21/38* (2011.01)
*B60R 21/36* (2011.01)
*H04N 7/18* (2006.01)
*B60R 21/013* (2006.01)

(52) U.S. Cl.
CPC .............. *B60R 1/00* (2013.01); *B60R 21/013* (2013.01); *B60R 21/36* (2013.01); *B60R 21/38* (2013.01); *H04N 7/188* (2013.01); *B60R 2300/205* (2013.01); *B60R 2300/8033* (2013.01)

(58) Field of Classification Search
CPC ........... B60R 1/00; B60R 21/38; B60R 21/36; B60R 21/013; B60R 2300/8033; B60R 2300/205; H04N 7/188
See application file for complete search history.

(56) References Cited

U.S. PATENT DOCUMENTS 6,467,563 B1 10/2002 Ryan
6,474,679 B2 * 11/2002 Miyasaka ............... B60R 21/36 180/274
6,920,954 B2 * 7/2005 Hashimoto ......... B60R 21/2155 180/274
7,483,777 B2 * 1/2009 Takahashi ............. B60R 21/013 280/762
7,543,677 B2 * 6/2009 Igawa ................. B60R 21/0134 180/274
7,630,806 B2 * 12/2009 Breed ................. B60R 21/0134 180/273
7,836,996 B2 * 11/2010 Kitte ....................... B60R 21/36 180/271
7,845,691 B2 * 12/2010 Sundararajan .......... B60R 21/38 180/274

(Continued)

OTHER PUBLICATIONS

Jasper Karlsson, *DEFINE_PRESSURE_TUBE: A pressure tube sensor for pedestrian crash simulation, DYNAmore Nordic AB [Power Point Slides], 2017, Retrieved from https://www.dynamore.de/de/download/papers/2016-ls-dyna-forum/Papers%202016/montag-10.10.16/safety-airbags-and-pressure-tubes/define_pressure_tube-a-pressure-tube-sensor-for-pedestrian-crash.

*Primary Examiner* — Tyler J Lee

(57) ABSTRACT

One general aspect includes a method to display information after a pedestrian crash incident, the method including: receiving, at a controller, an indication of a pedestrian crash incident; in response to the pedestrian crash incident indication, via the controller, deploying a pedestrian protection apparatus to raise a portion of a hood of a vehicle; in response to the pedestrian crash incident indication, via the controller, activating one or more sensors to capture one or more images of at least a portion of a vehicle environment; adapting the captured image, via the controller, to be exhibited on a display; and exhibiting the captured images, via the controller, on the display.

20 Claims, 4 Drawing Sheets

(56) References Cited

U.S. PATENT DOCUMENTS

| | | | |
|---|---|---|---|
| 7,954,587 B2 * | 6/2011 | Kisanuki | B60R 21/36 180/274 |
| 9,610,913 B2 | 4/2017 | Narita | |
| 9,809,187 B2 | 11/2017 | Yamaguchi | |
| 9,926,949 B2 | 3/2018 | Henck | |
| 9,950,689 B2 * | 4/2018 | Farrington | B60R 21/38 |
| 10,059,347 B2 * | 8/2018 | Thieberger-Navon | B60W 50/14 |
| 2002/0033755 A1 * | 3/2002 | Ishizaki | B60R 21/0136 340/436 |
| 2004/0182629 A1 * | 9/2004 | Takahashi | B60R 21/013 180/274 |
| 2006/0050927 A1 * | 3/2006 | Klomark | B60R 21/013 382/103 |
| 2007/0102219 A1 | 5/2007 | Park | |
| 2012/0078499 A1 * | 3/2012 | Park | B60R 21/0136 701/301 |
| 2015/0274118 A1 | 10/2015 | Schondorf | |
| 2016/0059823 A1 | 3/2016 | Jayasuriya | |
| 2016/0100088 A1 * | 4/2016 | Sekiguchi | B60W 50/00 701/48 |
| 2017/0066449 A1 * | 3/2017 | Lee | B60G 17/019 |

* cited by examiner

SYSTEM AND METHOD TO EXHIBIT INFORMATION AFTER A PEDESTRIAN CRASH INCIDENT

INTRODUCTION

When a vehicle with active hood technology impacts a pedestrian, the vehicle's hood (and any installed airbag) will be deployed to minimize bodily injuries sustained by the pedestrian. However, the deployed condition of the hood (and airbag) will obscure the visibility of environment around the front of the vehicle and can thereby cause panic in the vehicle's driver, which could lead to a secondary collision with the fallen pedestrian or could lead the driver to run into other road objects. Accordingly, it is desirable to provide a system and method that can assist the driver with better visibility of the vehicle environment after a pedestrian crash resulting in their obstructed view due to vehicle's hood being raised and windshield airbag deployed. Furthermore, other desirable features and characteristics of the present invention will become apparent from the subsequent detailed description of the invention and the appended claims, taken in conjunction with the accompanying drawings and this background of the invention.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method to display information after a pedestrian crash incident, the method including: receiving, at a controller, an indication of a pedestrian crash incident; in response to the pedestrian crash incident indication, via the controller, deploying a pedestrian protection apparatus to raise a portion of a hood of a vehicle; in response to the pedestrian crash incident indication, via the controller, activating one or more sensors to capture one or more images of at least a portion of a vehicle environment; adapting the captured image, via the controller, to be exhibited on a display; and exhibiting the captured images, via the controller, on the display. Other embodiments of this aspect include corresponding computer systems, apparatus, and computer programs recorded on one or more computer storage devices, each configured to perform the actions of the methods.

Implementations may include one or more of the following features. The method further including, after the pedestrian protection apparatus has been deployed, via the controller, deploying an airbag cushion to substantially cover a vehicle-exterior-facing side of a windshield. The method where the controller is located in the vehicle. The method where the pedestrian crash incident indication is received from a pedestrian collision detection sensor located within a bumper of the vehicle. The method where the one or more sensors are one or more cameras located on a bumper of the vehicle and/or a roof of the vehicle, the one or more cameras configured to capture at least a portion of the hood of the vehicle and/or an area in front of the vehicle. The method where the display is a heads-up display located in an interior of the vehicle, the heads-up display configured to present data on a vehicle-interior-facing side of a windshield. The method where the display is a heads-up display located in an interior of the vehicle, the heads-up display configured to present data on a transparent plane located in the interior of the vehicle. Implementations of the described techniques may include hardware, a method or process, or computer software on a computer-accessible medium.

One general aspect includes a system to display information after a pedestrian crash incident, the system including: a memory configured to include a program and a controller configured to execute the program, where the program enables the controller to: receive an indication of a pedestrian crash incident; in response to the pedestrian crash incident indication, deploy a pedestrian protection apparatus to raise a rear portion of a hood of a vehicle; in response to the pedestrian crash incident indication, activate one or more sensors to capture one or more images of at least a portion of a vehicle environment; adapt the captured images to be exhibited on a display; and exhibit the captured image on the display. Other embodiments of this aspect include corresponding computer systems, apparatus, and computer programs recorded on one or more computer storage devices, each configured to perform the actions of the methods.

Implementations may include one or more of the following features. The system further including, after the pedestrian protection apparatus has been deployed, deploy an airbag cushion to substantially cover a vehicle-exterior-facing side of a windshield. The system where the controller is located in the vehicle. The system where the pedestrian crash incident indication is received from a pedestrian collision detection sensor located within a bumper of the vehicle. The system where the one or more sensors are one or more cameras located on a bumper of the vehicle and/or a roof of the vehicle, the one or more cameras configured to capture at least a portion of the hood of the vehicle and/or an area in front of the vehicle. The system where the display is a heads-up display located in an interior of the vehicle, the heads-up display configured to present data on a vehicle-interior-facing side of a windshield. The system where the display is a heads-up display located in an interior of the vehicle, the heads-up display configured to present data on a transparent plane located in the interior of the vehicle. Implementations of the described techniques may include hardware, a method or process, or computer software on a computer-accessible medium.

One general aspect includes a non-transitory and machine-readable medium having stored thereon executable instructions adapted to display information after a pedestrian crash incident, which when provided to a controller and executed thereby, causes the controller to: receive an indication of a pedestrian crash incident; in response to the pedestrian crash incident indication, deploy a pedestrian protection apparatus to raise a rear portion of a hood of a vehicle; in response to the pedestrian crash incident indication, activate one or more sensors to capture one or more images of at least a portion of a vehicle environment; adapt the captured images to be exhibited on a display; and exhibit the captured image on the display. Other embodiments of this aspect include corresponding computer systems, apparatus, and computer programs recorded on one or more computer storage devices, each configured to perform the actions of the methods.

Implementations may include one or more of the following features. The non-transitory and machine-readable memory further including, after the pedestrian protection apparatus has been deployed, via the controller, deploy an airbag cushion to substantially cover an exterior-facing-side of a windshield. The non-transitory and machine-readable memory where the controller is located in the vehicle. The non-transitory and machine-readable memory where the pedestrian crash incident indication is received from a pedestrian collision detection sensor located within a bumper of the vehicle. The non-transitory and machine-readable memory where the one or more sensors are one or more cameras located on a bumper of the vehicle and/or a roof of the vehicle, the one or more cameras configured to capture at least a portion of the hood of the vehicle and/or an area in front of the vehicle. The non-transitory and machine-readable memory where the display is a heads-up display located in an interior of the vehicle, the heads-up display configured to present data on a vehicle-interior-facing side of a windshield. Implementations of the described techniques may include hardware, a method or process, or computer software on a computer-accessible medium.

BRIEF DESCRIPTION OF THE DRAWINGS

The disclosed examples will hereinafter be described in conjunction with the following drawing figures, wherein like numerals denote like elements, and wherein.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
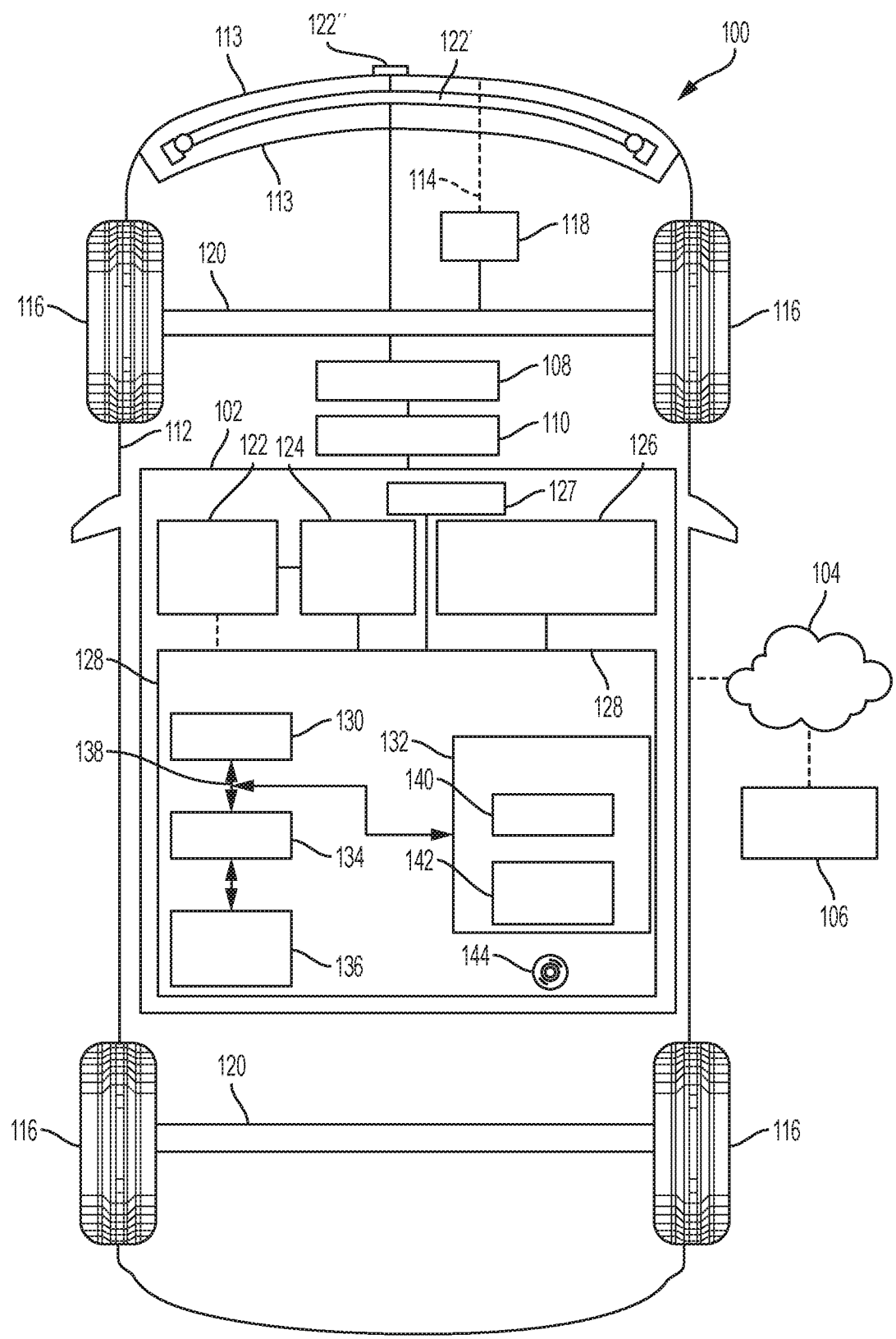
FIG. 1 is a functional block diagram of a vehicle that includes a control system for controlling and implementing a system and method to display information after a pedestrian crash incident in accordance with one or more exemplary embodiments discussed herein.

FIG. 1 illustrates a vehicle 100, according to an exemplary embodiment. As described in greater detail further below, the vehicle 100 includes a control system 102 to automatically transmit an emergency services request after the occurrence of a pedestrian crash incident. In various embodiments, the control system 102 facilitates communications between the vehicle 100 and a peer network 104 having various other participants 106. Also in various embodiments, the control system 102 is coupled to various vehicle modules 108 (e.g., braking control, engine control, transmission control, instrument pack, infotainment module, body control module (BCM), audio system, pedestrian protection system, lighting, climate control, and so on, in certain embodiments) via one or more vehicle buses 110 (e.g., one or more vehicle CAN buses, in certain embodiments).

One of the modules 108 includes a pedestrian protection apparatus connected to the hood of vehicle 100 and adapted to reduce the magnitude of injury to a pedestrian upon impact with vehicle 100. The pedestrian protection apparatus 108 can be embodied as a hydraulic or pyrotechnic actuator that uses explosion force to rapidly lift the heavy hood. As such, the hood is raised at the rear portion and uses the hood latch as a pivot point to create a gap between the hood and rest of a body 112 of vehicle 100, for absorbing/lessening impact of the pedestrian fallen on the vehicle hood. In various embodiments, an inflatable airbag cushion 150 is installed relative to the pedestrian protection apparatus 108. The inflatable airbag 150 deploys from an airbag module having a gas generating inflator when the hydraulic/pyrotechnic actuator has deployed to lift the hood. Moreover, when properly deployed, the airbag cushion will be in substantially covering relation to the vehicle windshield to absorb/lessen the impact of the pedestrian sliding into the windshield after falling onto the vehicle's hood.

In various embodiments, the vehicle 100 comprises an automobile. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 100 may also comprise a motorcycle or other vehicle, and/or one or more other types of mobile platforms (e.g., a robot, a ship, and so on) and/or other systems.

The vehicle's body 112 is arranged on a chassis 114. The body 112 substantially encloses other components of the vehicle 100 and includes a front bumper 113. The body 112 and the chassis 114 may jointly form a frame. The vehicle 100 also includes a plurality of wheels 116. The wheels 116 are each rotationally coupled to the chassis 114 near a respective corner of the body 112 to facilitate movement of the vehicle 100. In one embodiment, the vehicle 100 includes four wheels 116, although this may vary in other embodiments (for example for trucks and certain other vehicles).

A drive system 118 is mounted on the chassis 114, and drives the wheels 116, for example via axles 120. The drive system 118 preferably comprises a propulsion system. In certain exemplary embodiments, the drive system 118 comprises an internal combustion engine and/or an electric motor/generator, coupled with a transmission thereof. In certain embodiments, the drive system 118 may vary, and/or two or more drive systems 118 may be used. By way of example, the vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

In various embodiments, the control system 102 controls communications with the peer network 104, for example for use in performing actions respect to one or more modules 108 of the vehicle 100 (e.g., vehicle braking, body control, engine control, pedestrian protection, transmission control, infotainment control, climate control, lighting control, audio system control, instrument control, and so on), among other vehicle actions. Also in various embodiments, the control system 102 is disposed within the body 112 of the vehicle 100. In one embodiment, the control system 102 is mounted on the chassis 114. In certain embodiments, the control system 102 and/or one or more components thereof may be disposed outside the body 112, for example, on a remote server, in the cloud, or in a remote smart phone or other device where image processing is performed remotely. In addition, in certain embodiments, the control system 102 may be disposed within and/or as part of the vehicle modules 108, drive system 118, and/or within and/or or as part of one or more other vehicle systems. Also, as depicted in FIG. 1, in various embodiments the control system 102 is coupled to the vehicle modules 108 via the vehicle communication bus 110, and is further coupled to the peer network 104.

As depicted in FIG. 1, the control system 102 includes various sensors 122, a sensor interface 124, a transceiver 126, a visual display 127, and a controller 128. In various embodiments, the sensors 122 include a pedestrian collision detection sensor (122'), cameras (122"), vehicle velocity sensors (e.g., accelerometers), radar sensors, infrared sensors, engine control sensors, and/or various other sensors pertaining to the various modules 108 and/or operation of the vehicle 100. In various embodiments, the sensor interface 124 facilitates communications between the sensors 122 and the controller 128.

In various embodiments, the pedestrian collision detection sensor 122' (collision sensor 122') is generally known to include a pressure tube formed in an elongated shape, and a pair of pressure sensors at each end of the pressure tube which output signals according to a change in pressure in the pressure tube. Moreover, the pressure tube may be a hollow structural body with a substantially circular ring-shaped cross-section using a silicon tube (or the like) and the pressure tube may be embedded in an absorber compound (e.g., a urethane foam resin material disposed within the front bumper 113). The pressure sensors are also electrically connected to controller 128 and signals are output from these pressure sensors to the controller 128 according to the change in pressure inside the pressure tube (i.e., when the pressure tube deforms).

The camera(s) 122" can be wide lens or ultra-wide lens cameras mounted around the body 112 to capture images of portions of the vehicle environment. For example, one or more of the cameras 122" can be mounted on the front bumper 113 and face away from the vehicle 100 so as to provide a view of the environment directly in front of vehicle 100. As follows, these cameras 122" can be angled such that they capture at least a portion of the ground (and any road objects) which lies directly in front of the bumper. In addition, one or more of the cameras 122" can also be mounted at the front portion of the vehicle's roof and angled to capture at least a portion of the hood 148 of the vehicle.

In various embodiments, the transceiver 126 facilitates and provides communications between the vehicle 100 and the peer network 104. For example, in various embodiments, the transceiver 126 provides communications (e.g., including data pertaining to operation of the vehicle 100 and/or including recommendations for the vehicle 100) to the peer network 104 (e.g., from one or more other network participants 106. In certain embodiments, the transceiver 126 may also receive, provide, and/or facilitate communications between the controller 128 and the sensors 122 and/or vehicle modules 108. In various embodiments, the transceiver 126 may include a single transceiver and/or multiple transceivers, and may include one or more similar devices such as one or more receivers, transmitters, and/or communication modules (which will collectively be referred to as a "transceiver" for the purposes of this Application).

In various embodiments, one of the modules is a visual display 127 that is a heads-up display reflected off of the windshield or vertical plane, and can present data on the windshield in such a way that the vehicle driver does not have to look away from their usual viewpoints. For example, visual display 127 may present images on the windshield that have been captured by the cameras 122".

The controller 128 controls operation of the control system 102, and the communications with the peer network 104. In various embodiments, the controller 128 is coupled to the sensors 122 (e.g., via the sensor interface 124), the transceiver 126, the vehicle modules 108 (e.g., via the vehicle bus 110), and to the peer network 104. In various embodiments, the control system 102 receives data from the sensors 122, the vehicle modules 108, and the peer network 104, processes the data, controls vehicle actions using the data via the vehicle modules 108, and controls the vehicle 100's communications with the peer network 104. In various embodiments, the controller 128 provides these and other functions in accordance with the steps of the processes discussed further below in connection with FIG. 2.

Also in one embodiment, the controller 128 is disposed within the control system 102, within the vehicle 100. In certain embodiments, the controller 128 (and/or components thereof, such as the processor 130 and/or other components) may be part of and/or disposed within one or more other vehicle components. Also in certain embodiments, the controller 128 may be disposed in one or more other locations of the vehicle 100. In addition, in certain embodiments, multiple controllers 128 may be utilized. In addition, in certain embodiments, the controllers 128 can be placed outside the vehicle, such as in a remote server, in the cloud or on a remote smart device.

As depicted in FIG. 1, the controller 128 comprises a computer system. In certain embodiments, the controller 128 may also include one or more of the sensors 122, the transceiver 126, one or more components thereof, and/or one or more other components of the vehicle 100. In addition, it will be appreciated that the controller 128 may otherwise differ from the embodiment depicted in FIG. 1. For example, the controller 128 may be coupled to or may otherwise utilize one or more remote computer systems and/or other control systems, for example as part of one or more of the above-identified vehicle 100 devices and systems.

In the depicted embodiment, the computer system of the controller 128 includes a processor 130, a memory 132, an interface 134, a storage device 136, and a bus 138. The processor 130 performs the computation and control functions of the controller 128, and may comprise any type of processor or multiple processors, single integrated circuits such as a microprocessor, or any suitable number of integrated circuit devices and/or circuit boards working in cooperation to accomplish the functions of a processing unit. During operation, the processor 130 executes one or more programs 140 contained within the memory 132 and, as such, controls the general operation of the controller 128 and the computer system of the controller 128, generally in executing the processes described herein, such as the processes discussed further below in connection with FIG. 2. While the processor 130 is depicted in FIG. 1 as being part of the controller 128, it will be appreciated that in certain embodiments the processor 130 (and/or one or more additional processors) may also be part of various other vehicle components, such as (by way of example) one or more vehicle modules 108 (e.g., an engine control unit), sensors 122, drive system 118, transceiver 126, and so on.

The memory 132 can be any type of suitable memory. For example, the memory 132 may include various types of dynamic random-access memory (DRAM) such as SDRAM, the various types of static RAM (SRAM), and the various types of non-volatile memory (PROM, EPROM, and flash). In certain examples, the memory 132 is located on and/or co-located on the same computer chip as the processor 130. In the depicted embodiment, the memory 132 stores the above-referenced program 140 along with one or more stored values 142.

The bus 138 serves to transmit programs, data, status and other information or signals between the various components of the computer system of the controller 128. The interface 134 allows communication to the computer system of the controller 128, for example from a system driver and/or another computer system, and can be implemented using any suitable method and apparatus. In one embodiment, the interface 134 obtains the various data from the sensors 122, vehicle modules 108, and/or transceiver 126. The interface 134 can include one or more network interfaces to communicate with other systems or components. The interface 134 may also include one or more network interfaces to communicate with technicians, and/or one or more storage interfaces to connect to storage apparatuses, such as the storage device 136.

The storage device 136 can be any suitable type of storage apparatus, including various different types of direct access storage and/or other memory devices. In one exemplary embodiment, the storage device 136 comprises a program product from which memory 132 can receive a program 140 that executes one or more embodiments of one or more processes of the present disclosure, such as those set forth in FIG. 2 and discussed below. In another exemplary embodiment, the program product may be directly stored in and/or otherwise accessed by the memory 132 and/or a disk (e.g., disk 144), such as that referenced below.

The bus 138 can be any suitable physical or logical means of connecting computer systems and components. This includes, but is not limited to, direct hard-wired connections, fiber optics, infrared and wireless bus technologies. During operation, the program 140 is stored in the memory 132 and executed by the processor 130.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 130) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 128 may also otherwise differ from the embodiment depicted in FIG. 1, for example in that the computer system of the controller 128 may be coupled to or may otherwise utilize one or more remote computer systems and/or other control systems.

Method

Figure 2:
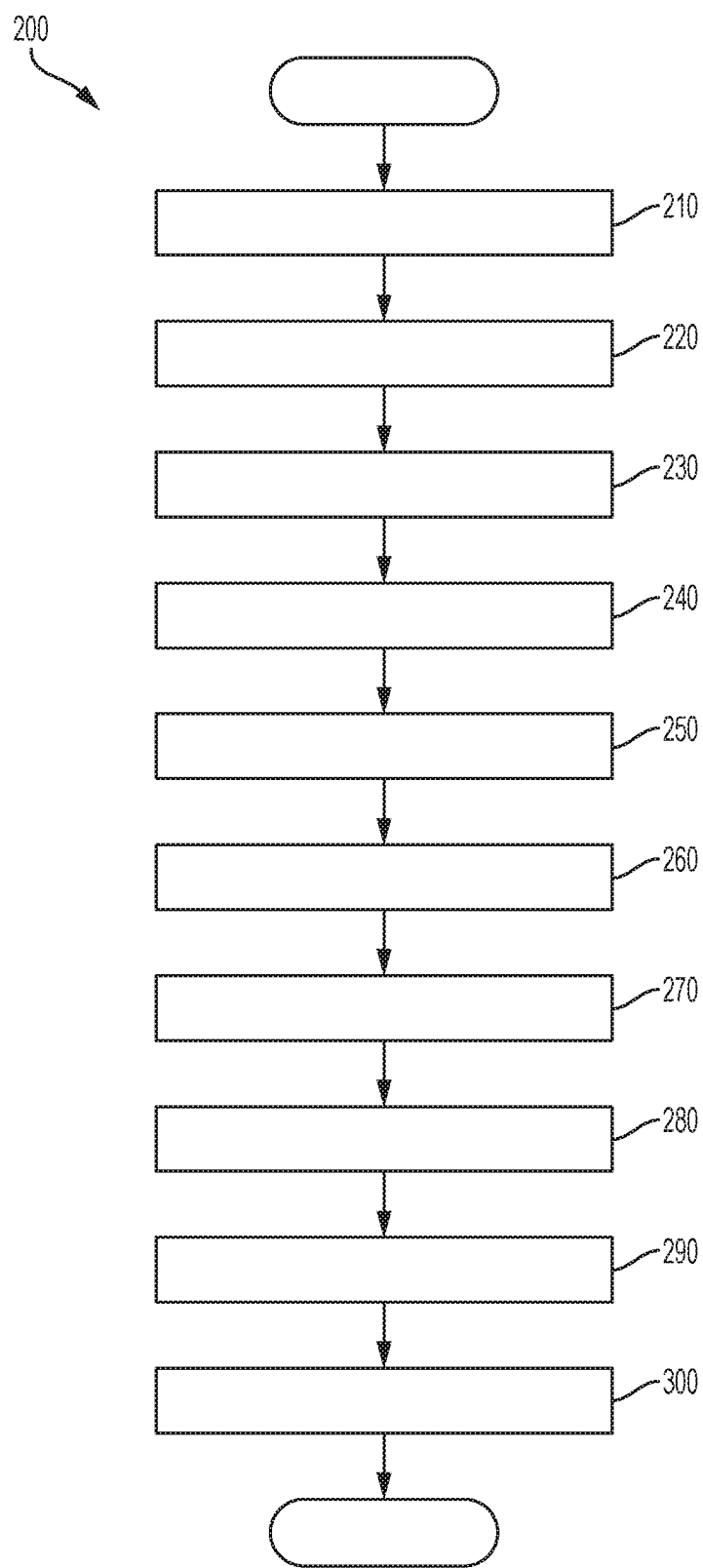
FIG. 2 is a flowchart of an exemplary process to display information after a pedestrian crash incident in accordance with one or more exemplary embodiments.

Now turning to FIG. 2, there is shown an embodiment of a method 200 to cause a vehicle to automatically display vehicle-environment information in the interior of the vehicle 100 after a pedestrian crash incident which causes an obstructed driver-side view due to the active hood system. One or more aspects of pedestrian impact notification method 200 may be completed through controller 128 which may include one or more executable instructions incorporated into memory 132 and carried out by processor 130. One or more ancillary aspects of method 200 may also be completed by pedestrian protection apparatus 108, cameras 122", and visual display 127. These configurations may be established by a vehicle manufacturer at or around the time of the system's assembly or after-market (e.g., via vehicle download or at a time of vehicle service, just to name a couple of examples).

Figure 3:
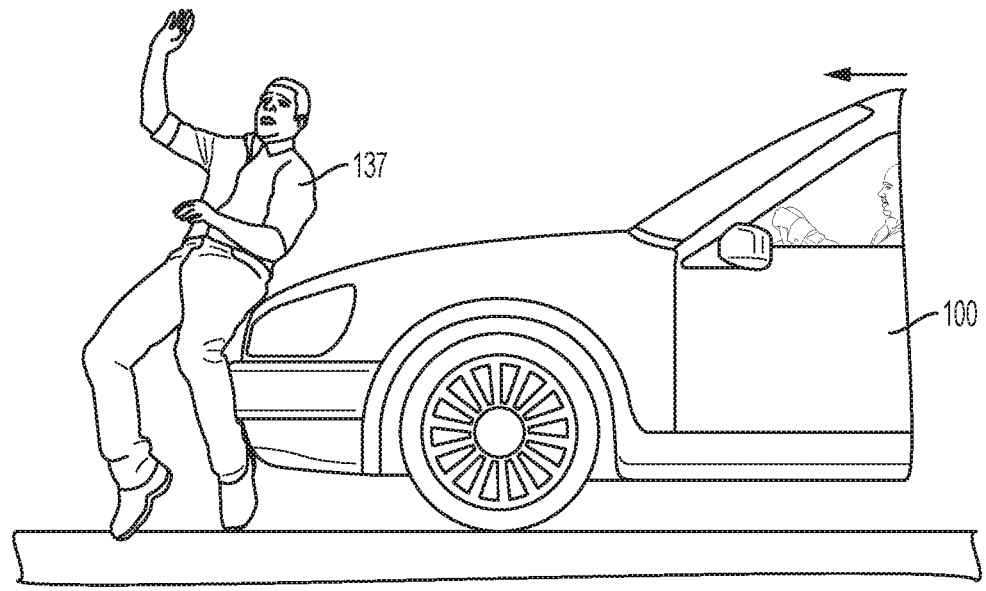
FIG. 3 depicts an application of an exemplary aspect of the process of FIG. 2 in accordance with one or more exemplary embodiments.

Method 200 begins at 210 in which vehicle 100 is traversing along a path, from one location to another. With additional reference to FIG. 3, at step 220, the vehicle 100 collides with a pedestrian 137 (i.e., person walking along a road or in a developed area) while the vehicle 100 is traversing along its designated path. During this collision, the front bumper 113 is pressed inwards (by a body part of the pedestrian) and toward the rest of the vehicle's body 112 by the body mass of the pedestrian. The front bumper 113 thereby presses the absorber compound toward the body 112 and thus the absorber presses the pressure tube of collision sensor 122' while undergoing deformation to deform the pressure tube and change the pressure inside the pressure tube as a result.

In step 230, when the pressure inside the pressure tube sufficiently changes, the pressure sensors will output one or more signals corresponding to the pressure change to controller 128. In step 240, the controller 128 (via processor 130) will compute the collision load based on the output signals from the pressure sensors. In step 250, in response to this crash indication, the controller 128 inquires speed data from the vehicle velocity sensor(s) 122 and in turn computes the collision speed based on the output signal from the velocity sensor(s) 122. The controller 128 then derives the effective mass of the pedestrian from the computed collision load and collision speed, verifies the effective mass exceeds the threshold value, and thus verifies that the body colliding with the front bumper 113 is in fact a pedestrian.

Figure 4:
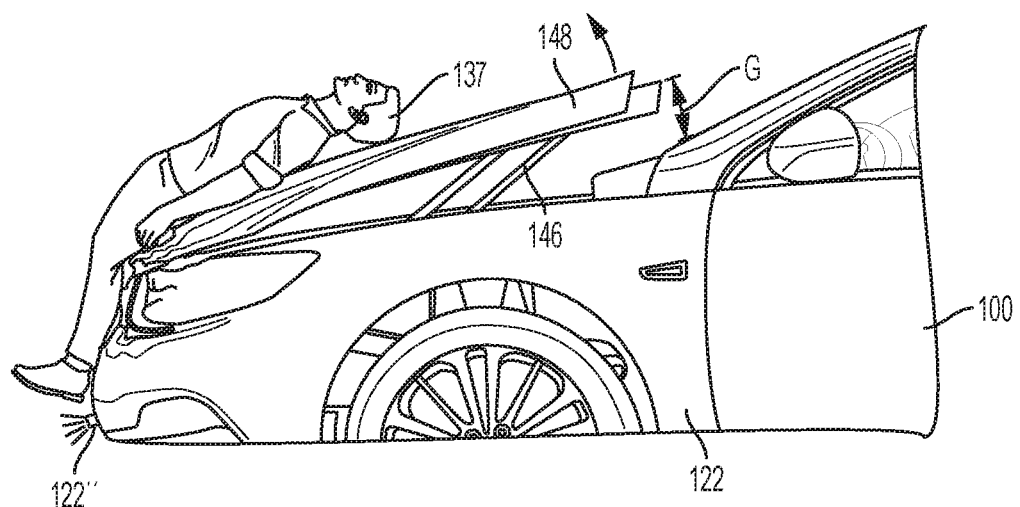
FIG. 4 depicts an application of another exemplary aspect of the process of FIG. 2 in accordance with one or more exemplary embodiments.

With additional reference to FIG. 4, in step 260, upon verifying that a pedestrian has hit the vehicle 100, controller 128 will deploy the pedestrian protection apparatus 108. Thus, the pedestrian protection apparatus 108 will separate the hood 148 from the drive system 118 and the vehicle body 112 to form a gap (G) therebetween for absorbing or lessening the impact of the pedestrian 137 when they fall on the hood 148. It should be understood that the pedestrian protection apparatus 108 is shown as hydraulic actuators but can be embodied as some other known type of actuator, for example, pyrotechnic actuators.

Figure 5:
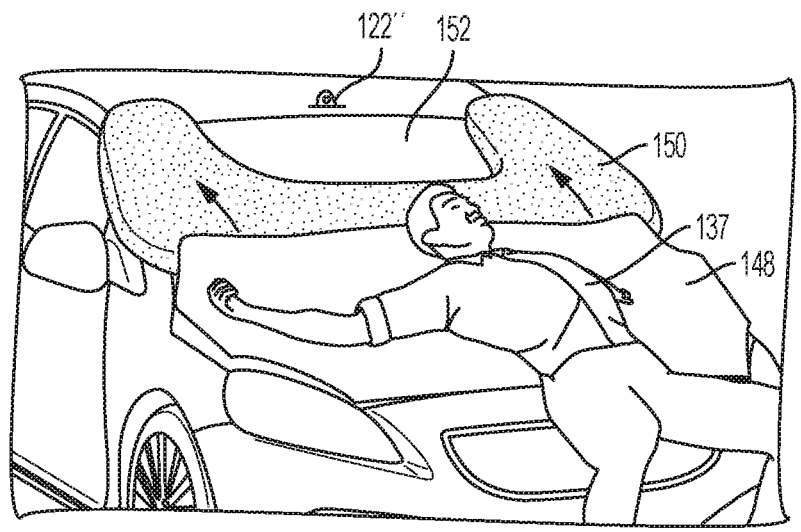
FIG. 5 depicts an application of another exemplary aspect of the process of FIG. 2 in accordance with one or more exemplary embodiments.

With additional reference to FIG. 5, in optional step 270, once the pedestrian protection apparatus 108 has been properly deployed, controller 128 will additionally deploy an airbag cushion 150 which covers the vehicle-exterior-facing side of the vehicle's windshield 152. Thus, the gas generating inflator will rapidly inflate the airbag cushion 150 outwardly from an airbag module positioned adjacent to the lower edge of the windshield 152. As shown, when the airbag cushion 150 is fully inflated, it covers between two-thirds (⅔) and three-fourths (¾) of the windshield's exterior surface.

In step 280, also upon verifying that a pedestrian has hit the vehicle 100, controller 128 will activate the cameras 122″ mounted on the outer surface of front bumper 113 (FIG. 4) as well as the cameras 122″ mounted adjacent to the top of windshield (FIG. 5). As such, these cameras 122″ will capture images of the hood 148 and the area that lies around the front of the bumper 113.

In step 290, controller 128 will format the images captured by the cameras 122″ in such a way that they can be exhibited via the visual display 127. In this step, controller 128 will also combine the images in such a way that they reconstruct at least part of the environment that lies out front of the vehicle, which may include images of the lower portion of the windshield 152, hood 148, and what lies in front of the front bumper 113 (as well as what lies to the sides of the hood 148 and bumper 113). Controller 128 may also reconstruct parts of the images in a wire-frame view such that only the outlines of the vehicle components are displayed.

Figure 6:
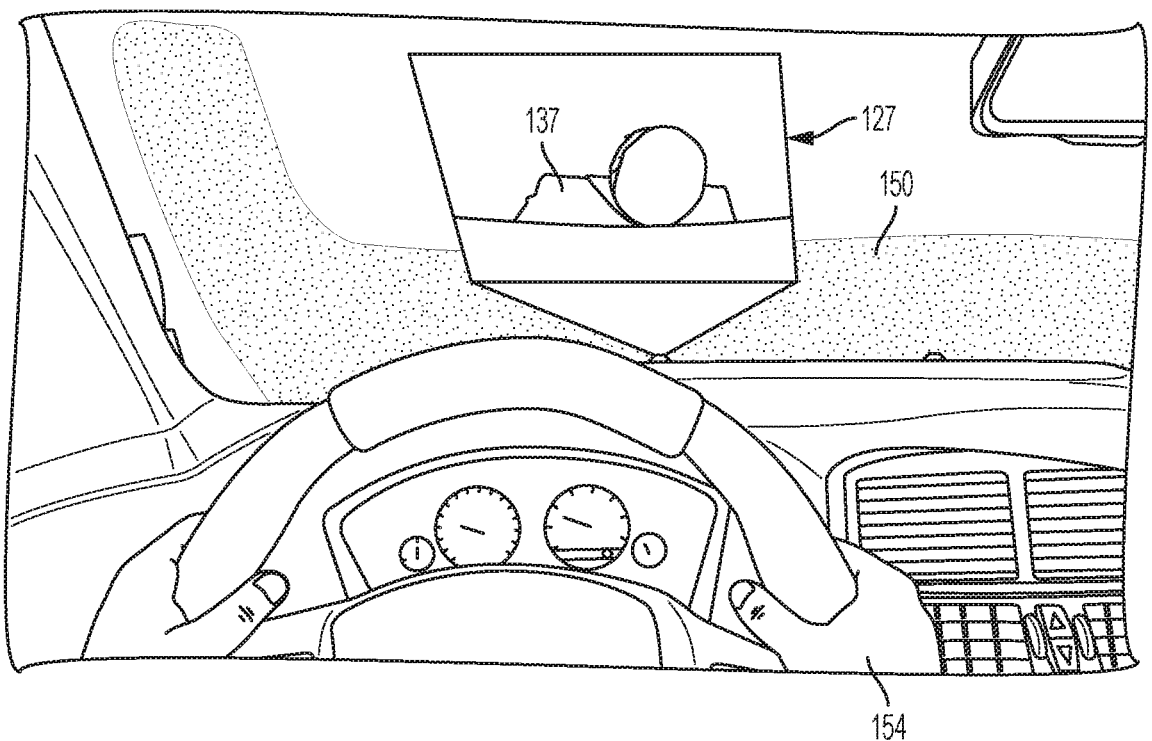
FIG. 6 depicts an application of another exemplary aspect of the process of FIG. 2 in accordance with one or more exemplary embodiments.

With additional reference to FIG. 6, in step 300, controller 128 will exhibit the images of the reconstructed environment out in front of the vehicle 100 via visual display 127. For example, when visual display 127 is a heads-up display, the images may be presented on the interior side of the windshield 152 such that they reflect off the pane of the windshield. In another example, the heads-up display may present the images on a transparent plane in the vehicle interior (e.g., a pane of glass mounted somewhere in front of the interior side of the windshield). It should be understood the exhibited images can be presented automatically after the pedestrian protection apparatus 108 has been activated. It should also be understood that one or more alerts may be triggered when the visual display 127 is activated to let the driver 154 know that the vehicle environment images are being exhibited.

As shown, the images can be a live feed to show where the pedestrian 137 has fallen after the crash incident (e.g., they may be lying on the ground in front of the vehicle or lying on the hood 148) and their current movement (e.g., they may be rolling in one direction away from the vehicle or rolling in one direction of the hood 148). These images being provided in the vehicle interior will assist the driver 154 to have proper visibility of the front of the vehicle 100 when their view would otherwise be obstructed by the raised hood 148 and inflated airbag cushion 150. The images may also prevent secondary collision with the pedestrian 137 because the driver 154 can see which direction the pedestrian 137 is moving to get away from the vehicle 100 after their fall. It should also be understood that in various other embodiments, the cameras will only capture a single image of the pedestrian 137 at some point after the vehicle 100 collides with pedestrian 137. After step 300, the method moves to completion.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the system and/or method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

None of the elements recited in the claims are intended to be a means-plus-function element within the meaning of 35 U.S.C. § 112(f) unless an element is expressly recited using the phrase "means for," or in the case of a method claim using the phrases "operation for" or "step for" in the claim.

What is claimed is:

1. A method to display information after a pedestrian crash incident, the method comprising:
   receiving, at a controller, an indication of a pedestrian crash incident;
   in response to the pedestrian crash incident indication, via the controller, deploying a pedestrian protection apparatus to raise a portion of a hood of a vehicle;
   in response to the pedestrian crash incident indication, via the controller, activating a plurality of cameras to capture one or more images of at least a portion of a vehicle environment, wherein at least one of the plurality of cameras is mounted to an exterior of a bumper of the vehicle to capture a first image of an area around the front of the bumper and at least one of the plurality of cameras is mounted to an exterior of a roof of the vehicle at a location adjacent to a top of a windshield to capture a second image of a hood of the vehicle;
   formatting, via the controller, the first and second images such that they can be exhibited by a display;
   combining, via the controller, the first and second images into a combined image, wherein the combined image is a reconstruction of at least part of the environment out front of the vehicle;
   outputting the combined image, via the controller, to the display to be exhibited; and
   exhibiting the combined image, via the controller, on the display.

2. The method of claim 1, further comprising, after the pedestrian protection apparatus has been deployed, via the controller, deploying an airbag cushion to substantially cover a vehicle-exterior-facing side of a windshield.

3. The method of claim 1, wherein the controller is located in the vehicle.

4. The method of claim 1, wherein the pedestrian crash incident indication is received from a pedestrian collision detection sensor located within a bumper of the vehicle.

5. The method of claim 1, wherein the display is a heads-up display located in an interior of the vehicle, the heads-up display configured to present data on a vehicle-interior-facing side of a windshield.

6. The method of claim 1, wherein the display is a heads-up display located in an interior of the vehicle, the heads-up display configured to present data on a transparent plane located in the interior of the vehicle.

7. The method of claim 1, wherein the combined image is a wire-frame view of the environment out front of the vehicle.

8. A system to display information after a pedestrian crash incident, the system comprising:
   a memory configured to comprise a program and a controller configured to execute the program, wherein the program enables the controller to:
   receive an indication of a pedestrian crash incident;
   in response to the pedestrian crash incident indication, deploy a pedestrian protection apparatus to raise a rear portion of a hood of a vehicle;
   in response to the pedestrian crash incident indication, activate a plurality of cameras to capture one or more images of at least a portion of a vehicle environment, wherein at least one of the plurality of cameras is mounted to an exterior of a bumper of the vehicle to capture a first image of an area around the front of the bumper and at least one of the plurality of cameras is mounted to an exterior of a roof of the vehicle at a location adjacent to a top of a windshield to capture a second image of a hood of the vehicle;
   format the first and second images such that they can be exhibited by a display;
   combine the first and second images into a combined image, wherein the combined image is a reconstruction of at least part of the environment out front of the vehicle;
   output the combined image to the display to be exhibited; and
   exhibit the combined image on the display.

9. The system of claim 8, further comprising, after the pedestrian protection apparatus has been deployed, deploy an airbag cushion to substantially cover a vehicle-exterior-facing side of a windshield.

10. The system of claim 8, wherein the controller is located in the vehicle.

11. The system of claim 8, wherein the pedestrian crash incident indication is received from a pedestrian collision detection sensor located within a bumper of the vehicle.

12. The system of claim 8, wherein the display is a heads-up display located in an interior of the vehicle, the heads-up display configured to present data on a vehicle-interior-facing side of a windshield.

13. The system of claim 8, wherein the display is a heads-up display located in an interior of the vehicle, the heads-up display configured to present data on a transparent plane located in the interior of the vehicle.

14. The system of claim 8, wherein the combined image is a wire-frame view of the environment out front of the vehicle.

15. A non-transitory and machine-readable medium having stored thereon executable instructions adapted to display information after a pedestrian crash incident, which when provided to a controller and executed thereby, causes the controller to:
   receive an indication of a pedestrian crash incident;
   in response to the pedestrian crash incident indication, deploy a pedestrian protection apparatus to raise a rear portion of a hood of a vehicle;
   in response to the pedestrian crash incident indication, activate a plurality of cameras to capture one or more images of at least a portion of a vehicle environment, wherein the at least one of the plurality of cameras is mounted to an exterior of a bumper of the vehicle to capture a first image of an area around the front of the bumper and at least one of the plurality of cameras is mounted to an exterior of a roof of the vehicle at a location adjacent to a top of a windshield to capture a second image of a hood of the vehicle;
   format the first and second images such that they can be exhibited by a display;
   combine the first and second images into a combined image, wherein the combined image is a reconstruction of at least part of the environment out front of the vehicle;
   output the combined image to the display to be exhibited; and
   exhibit the combined image on the display.

16. The non-transitory and machine-readable memory of claim 15, further comprising, after the pedestrian protection apparatus has been deployed, via the controller, deploy an airbag cushion to substantially cover an exterior-facing-side of a windshield.

17. The non-transitory and machine-readable memory of claim 15, wherein the controller is located in the vehicle.

18. The non-transitory and machine-readable memory of claim 15, wherein the pedestrian crash incident indication is received from a pedestrian collision detection sensor located within a bumper of the vehicle.

19. The non-transitory and machine-readable memory of claim 15, wherein the display is a heads-up display located in an interior of the vehicle, the heads-up display configured to present data on a vehicle-interior-facing side of a windshield.

20. The non-transitory and machine-readable memory of claim 15, wherein the combined image is a wire-frame view of the environment out front of the vehicle.

\* \* \* \* \*